(12) United States Patent
Garver

(10) Patent No.: US 6,561,741 B2
(45) Date of Patent: May 13, 2003

(54) FASTENER WITH ALIGNING LEAD THREAD

(76) Inventor: Michael A. Garver, 6147 Winans Dr., Brighton, MI (US) 48116

(*) Notice: Subject to any disclaimer, the term of this patent is extended or adjusted under 35 U.S.C. 154(b) by 88 days.

(21) Appl. No.: 09/740,438

(22) Filed: Dec. 19, 2000

(65) Prior Publication Data

US 2002/0076302 A1 Jun. 20, 2002

(51) Int. Cl.[7] .......................... F16B 25/00; F16B 35/04
(52) U.S. Cl. ...................... 411/386; 411/263; 411/413; 411/436
(58) Field of Search ................................ 411/263, 386, 411/412, 413, 411, 436

(56) References Cited

U.S. PATENT DOCUMENTS

| | | | |
|---|---|---|---|
| 3,586,353 A | 6/1971 | Lorenz et al. | 285/334 |
| 4,040,328 A | * 8/1977 | Muenchinger | 411/412 |
| 4,084,829 A | 4/1978 | Fälchle et al. | 279/99 |
| 4,179,976 A | 12/1979 | Sygnator | 85/47 |
| 4,549,754 A | 10/1985 | Saunders et al. | 285/334 |
| 4,658,088 A | 4/1987 | Gartland, Jr. et al. | 174/66 |
| 4,789,288 A | 12/1988 | Peterson | 411/386 |
| 4,815,907 A | 3/1989 | Williamson et al. | 411/107 |
| 4,907,930 A | 3/1990 | Peterson | 411/437 |
| 4,915,560 A | 4/1990 | Peterson et al. | 411/386 |
| 4,952,110 A | 8/1990 | Avgoustis et al. | 411/386 |
| 4,983,084 A | 1/1991 | Gray | 411/311 |
| 5,061,135 A | * 10/1991 | Pritchard | 411/411 |
| 5,088,869 A | * 2/1992 | Greenslade | 411/386 |
| 5,259,398 A | 11/1993 | Vrespa | 128/898 |
| 5,304,022 A | 4/1994 | Huska | 411/366 |
| 5,320,467 A | 6/1994 | Erbes | 411/386 |
| 5,419,667 A | 5/1995 | Avgoustis | 411/386 |
| 5,609,455 A | * 3/1997 | McKewan | 411/411 X |

FOREIGN PATENT DOCUMENTS

| | | |
|---|---|---|
| EP | 1 008 770 A3 | 12/2000 |
| FR | 2 697 875 A1 | 5/1994 |

OTHER PUBLICATIONS

1955, Machinery's Handbook, 15th Edition, p. 984–987.

* cited by examiner

*Primary Examiner*—Neill Wilson
(74) *Attorney, Agent, or Firm*—Baker Botts LLP

(57) ABSTRACT

A fastener having an aligning lead thread that does not follow the helical pattern of the fill threads around the shank of the fastener. The aligning lead thread is located on the shank distant from the first full thread to enable the engage the threads of a receiving member to pull the fastener elements into alignment rather than a standard lead thread which becomes trapped behind the threads of a receiving member.

21 Claims, 16 Drawing Sheets

FASTENER WITH ALIGNING LEAD THREAD

BACKGROUND OF THE INVENTION

1. Field of the Invention

The present invention relates to threaded fasteners such as screws, bolts and nuts, and more particularly, to anti-cross threading fasteners.

2. Description of the Related Technology

Threaded fastener technology is basic to the construction or fabrication of most articles of manufacture such as machines, automobiles, trains, planes, engines, and the like. Threaded fasteners may be bolts, screws, studs, rods, or other substantially round members having uniform, non-uniform or tapered external helical threads that are screwably engaged into mating threaded fasteners such as nuts, bolts or holes having substantially matching internal helical threads. For proper engagement of the externally and internally threaded fasteners, the longitudinal axis of the externally threaded member must be substantially collinear with a longitudinal axis of the mating internally threaded member. When the externally threaded member is not substantially collinear with the internally threaded member, cross-threading occurs.

Cross-threading generally occurs when there is misalignment between the externally threaded member, typically a screw or bolt, and the internally threaded member, typically a nut or other threaded hole. Specifically, cross-threading is the result of the threads of the two members attempting to engage at least one-half pitch out of alignment. When this situation happens, the two members are not collinear with each other and wedging of the threads will occur as the threaded helix are rotated against each other. If rotation continues, then threads on one or both members will be structurally damaged.

Current art typically has a lead thread, i.e., first thread pitch, which grows gradually from the minor diameter to the full height over one-half to two thread turns. The lead thread is therefore usually somewhat shorter than the full thread in any section and generally follows the helical path of the thread. The disadvantage of this configuration is found in its tendency, at angles of axial misalignment, to become trapped behind a mating female thread when the helix is engaged. This trapping happens where the lead thread has reached such a height as to not move freely under the opposing thread, and thus prevent the two helix from attaining axial alignment.

Referring to FIGS. 1A through 1F, a typical lead thread is shown. In particular, FIGS. 1A through 1E are cross-sectional side views of the lead in thread and several adjacent full threads of a fastener, taken at 0°, 90°, 180°, 270°, and 360° of rotation, respectively. FIG. 1F shows an end view of a fastener where points A, B, C, D and E correspond to the same characters in the other figures. In FIG. 1A, the lead thread begins to grow from the shank of the fastener. Through 90° of rotation, the lead thread grows to a height as indicated by reference character B. Through 180° of rotation, a cross-sectional side view of the fastener is shown in FIG. 1C. Here the lead thread has grown to a height which exceeds the pitch diameter. At 270° of rotation, the cross-sectional side view of the fastener is shown in FIG. 1D. The highest point of the lead thread is indicated by reference character D in both FIGS. 1D and 1F. In FIG. 1E, a cross-sectional side view of the fastener is shown where the fastener is rotated 360° from the position shown in FIG. 1A. In this view, the lead thread has grown to its maximum height as indicated by reference character E so as to merge into and become part of the first full thread.

In the fastener illustrated in FIGS. 1A through 1F, the lead thread grows from its minimum height to its maximum height over 360° of rotation. Alternative embodiments of fasteners will have shorter or longer lead threads depending upon the pitch of the fastener. For example, a fastener having a very long pitch, will have a very short lead thread, wherein the lead thread will grow from its minimum height to its maximum height over 120°–180° of rotation. Alternatively, in a fastener where the pitch is very short, it is possible for the lead thread to spiral around the shank of the fastener for several rotations far exceeding 360° of rotation.

Referring to FIG. 2, cross-sectional, side views of a male threaded fastener bolt 10 and a female threaded fastener nut 22 are shown. The bolt 10 has a typical lead thread 1 located at the distal end of the bolt 10. The longitudinal central axis of the bolt 10 and nut 22 are shown in misalignment. In this position, the first full thread 20 of the bolt 10 is shown engaged with the lead thread of the nut 22. The lead thread 1 of the bolt 10 is shown immediately adjacent to the first full thread 30 of the nut 22. Because the lead thread 1 is already tall enough so as to not pass freely below and past the first full thread 30 of the nut 22, a cross-thread condition will occur upon further engagement of these fasteners. In particular, because the lead thread 1 of the bolt 10 extends to the exterior side of the first full thread 30 of the nut 22, it has no opportunity to move to the interior side of the thread 30 so as to bring the fasteners 22 and 10 into axial alignment.

What is needed is a fastener that prevents cross-threading when an-externally threaded member engages an internally threaded member.

SUMMARY OF THE INVENTION

It is therefore an object of the present invention to prevent cross-threading when an externally threaded member engages an internally threaded member.

Another object is to correct misalignment (non-collinearity) between two screwably attachable members having mating helical threads thereon.

Another object of the present invention is to easily correct misalignment that may cause cross threading of a threaded fastener.

The present invention is a lead thread which, while remaining inside the profile of the standard thread, moves to its forward edge so as to insure that at such time as it reaches a height that it might interfere with the female profile, it is not trapped behind the female thread. This lead thread may have any shape that effectively places it under or in front of the female thread when it reaches the appropriate height. The inventive thread may be used by itself with standard threads or may be used in combination with other anti-cross threading threads.

Yet another object of the present invention is to correct misalignment between a first fastening member and a second fastening member by having one or more threads of the first member cam over the threads of the second member, thereby bringing the first and second 20 members into collinear alignment.

Still another object is to use a protruding diameter feature at one end of the first member to restrict the misalignment angle between the two members.

In an embodiment of the present invention, a self alignment anti-cross threading fastener comprises a substantially round first member such as, for example, a bolt or screw, having an external helically wound thread on the shank of the first member. At one end of the first member shank is a head adapted to be engaged by a means for applying rotational torque. The head may be slotted to receive a flat, Phillips, Torx head and the like screwdriver blade, or may have a plurality of flat surfaces parallel with the longitudinal axis of the first member shank for receiving a wrench, socket or other means for rotationally engaging the head.

At the other end of the first member shank, the first preferably at least one helical thread has a transitionally curved surface from the minor diameter to the major diameter. The transitional curved surface of the first at least one helical thread of the first member is adapted to cam over the mating component threads of the second member when in a cross-threading position, thereby collinearly aligning the first and second members together.

In another embodiment of the invention, the end of the first member opposite the head may have a protruding diameter feature, commonly referred to as a dog point. This protruding diameter feature restricts the range of presentation angles when the first member is inserted into the second member. Thus, the inherent misalignment may be restricted so that the first at least one helical thread having the transitionally curved surface may easily cam over the mating component threads so as to rapidly bring the two members into the correct collinear alignment wherein the remaining threads of the first and second members rotationally engage to properly fasten as intended. The curved surface on the transitional threads may be formed by rolling the threads in a rolling die having a mirror image contour of the curved surface desired on the threads. The transitional thread curved surface may also be formed on the threads by cutting, burnishing, grinding, machining, polishing, laser, or any combination thereof In still another embodiment of the present invention, at the end of the first member opposite the head, the first preferably at least one external helical thread has a transitional curved surface, or any combination of curved and/or flat surfaces approximating the shape defined by the curved surface, from the curve forming the minor diameter to the localized major diameter. The major diameter being defined as the outermost point of the helical thread in any localized axial section. The thread surface of the first at least one transitional thread is thus adapted to cam over the mating component threads of the second member when in a cross threading condition, thereby collinearly aligning the first and second members together.

In another embodiment of the present invention, at the end of the first member opposite the head, the first preferably at least one external helical thread has a truncated thread profile, approximating the shape formed by a radius drawn tangent to both thread flanks at their intersection with the curve forming the minor diameter. The minor diameter being defined as the innermost point of the helical thread in any localized axial section. The peak of the truncated thread may be flat or curved and maybe parallel to, or angled in relation to the screw thread axis. The thread surface of the first at least one transitional thread is thus adapted to cam over the mating component threads of the second member when in a cross threading condition, thereby collinearly aligning the first and second members together.

In a further embodiment of the present invention, a self aligning, anti-cross-threading fastener comprises a nut or other threaded member, having a helically wound thread on the interior of the member. The first preferably at least one internal helical thread has a transitional curved surface, or any combination of curved and/or flat surfaces approximating the shape defined by the curved surface, from the curve forming the major diameter to the localized minor diameter. The minor diameter being defined as the innermost point of the helical thread in any localized axial section. The thread surface of the first at least one transitional thread is thus adapted to cam over the mating component threads of the second member when in a cross threading condition, thereby collinearly aligning the first and second members together.

In another embodiment of the present invention, a self aligning, anti-cross-threading fastener comprises a nut or other threaded member, having helically wound threads oil the interior of the member. The first preferably at least one internal helical thread has a truncated thread profile, approximating the shape formed by a radius drawn tangent to both thread flanks at their intersection with the curve forming the major diameter. The major diameter being defined as the outermost point of the helical thread in any localized axial section. The peak of the truncated thread may be flat or curved and may be parallel to, or angled in relation to the screw thread axis. The thread surface of the first at least one transitional thread is thus adapted to cam over the mating component threads of the second member when in a cross threading condition, thereby collinearly aligning the first and second members together.

A feature of the present invention is a transitional curved surface from the minor diameter to the major diameter of the first at least one external thread of a first member, whereby the external thread surface area cams over the mating component threads of a second member and thereby collinearly realigns the first and second members together.

Another feature of the present invention is a protruding diameter feature, commonly referred to as a dog point, for restricting the presentation engagement angle of the two members.

Another feature is a self aligning, anti-cross-threading fastener having helically wound threads on the interior of the fastener.

Another feature is the transitional curved surface of at least one of the helical threads comprising any combination of curved and/or flat surfaces approximating the shape defined by the curved surface, from the curve forming the major diameter to the localized minor diameter.

An advantage of the present invention is a reliable and simple way of preventing cross-threading of a threaded fastener.

Another advantage is quick and reliable collinear alignment of a threaded fastener when rotatably engaging the threaded fastener by machine or unskilled labor.

Other and further objects, features and advantages will be apparent from the following description from the presently preferred embodiment of the invention, given for the purpose of disclosure and taken in conjunction with the accompanying drawings.

BRIEF DESCRIPTION OF THE DRAWINGS

The present invention is better understood by reading the following description of non-limitative embodiments with reference to the attached drawings wherein like parts in each of the several figures are identified by the same reference characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1A:
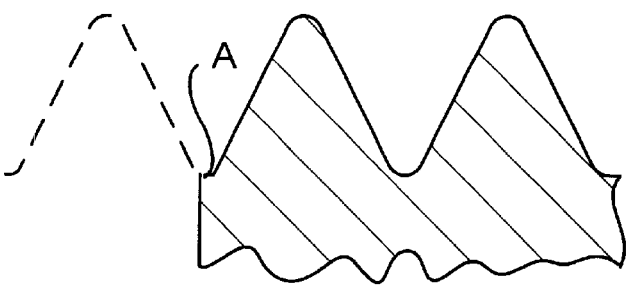
FIGS. 1A–1E are cross-sectional side views of a male fastener having a prior art lead thread, wherein each view is of the fastener at a different angle of rotation.
Figure 1B:
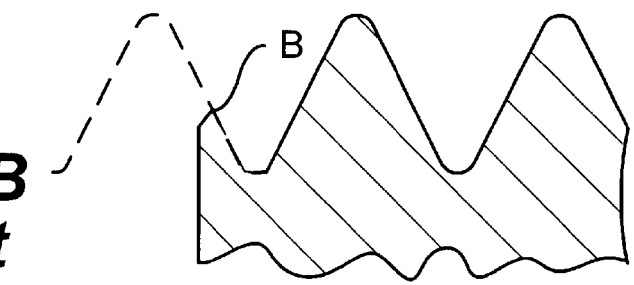
Figure 1C:
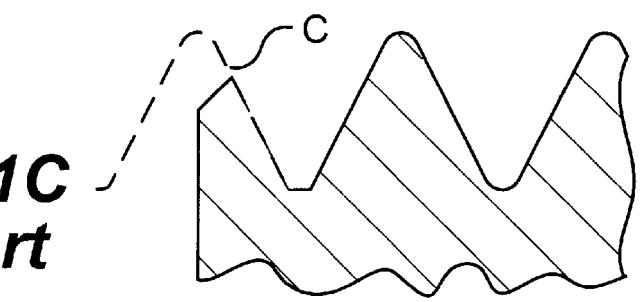
Figure 1D:
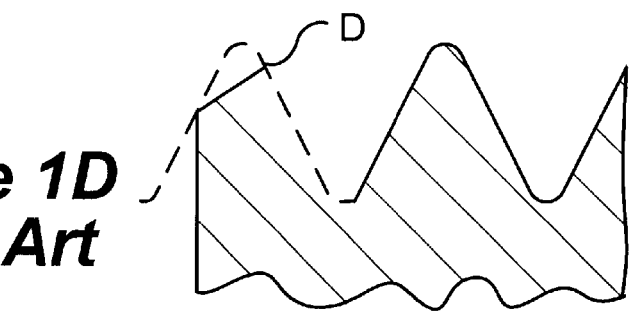
Figure 1E:
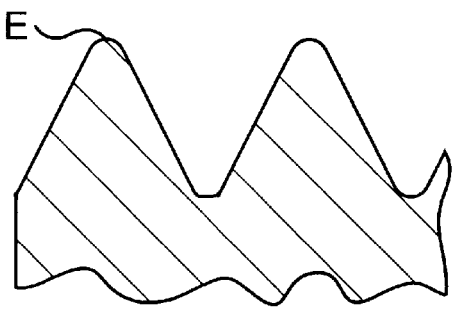
Figure 1F:
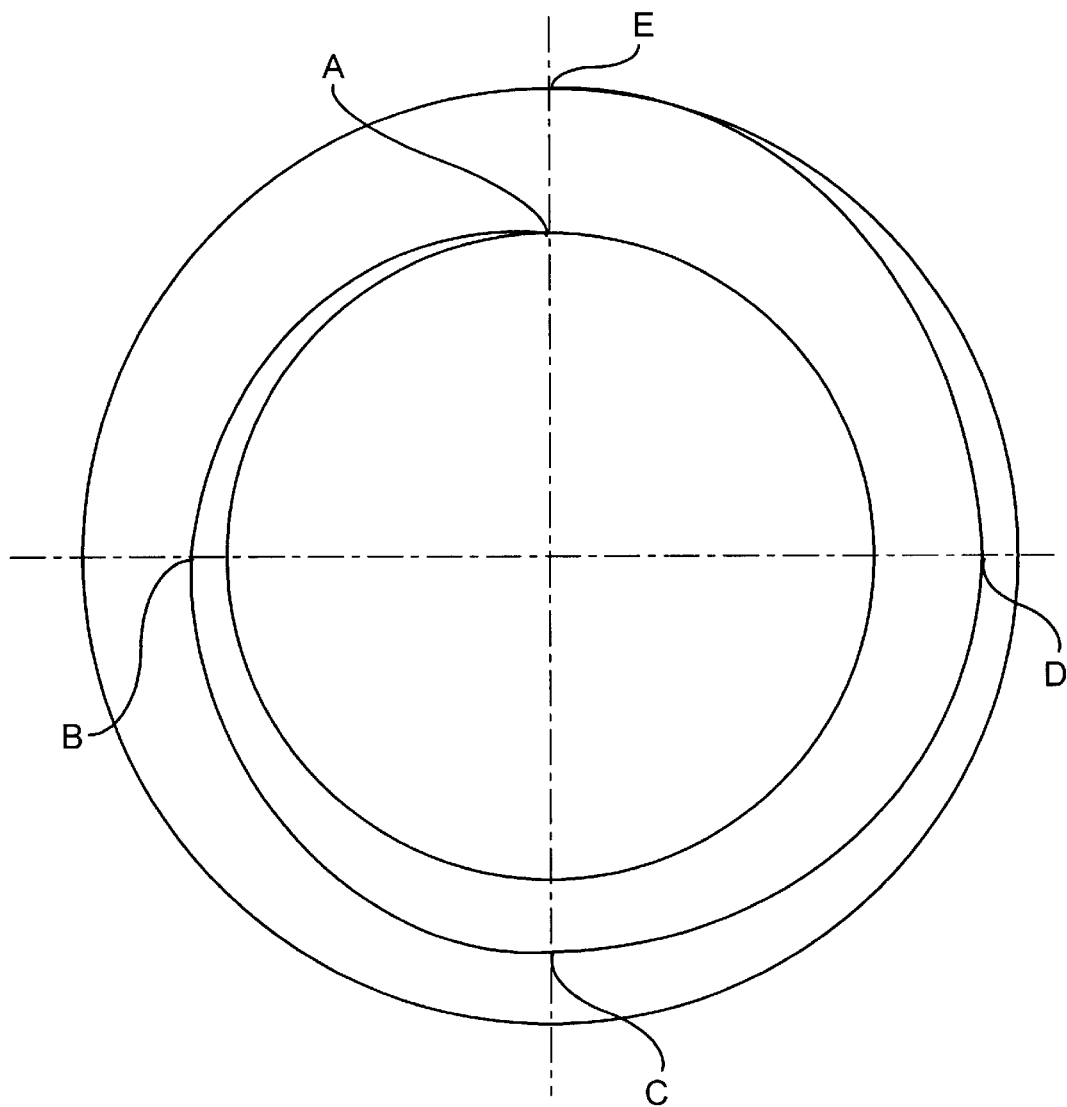
FIG. 1F is an end view of the male fastener shown in FIGS. 1A–1E wherein the lead thread is shown spiraling around the shank of the fastener.
Figure 2:
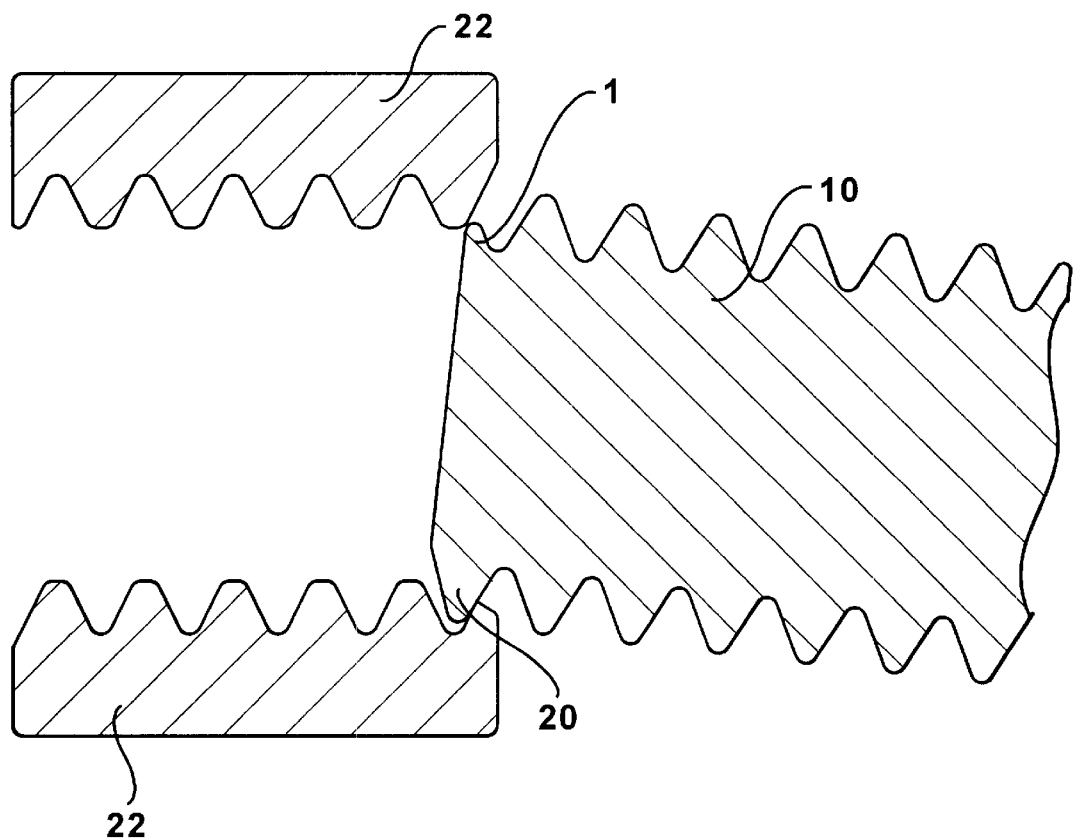
FIG. 2 is a cross-sectional side view of a male and female fastener in a misaligned position wherein the fasteners have prior art lead threads.
Figure 3A:
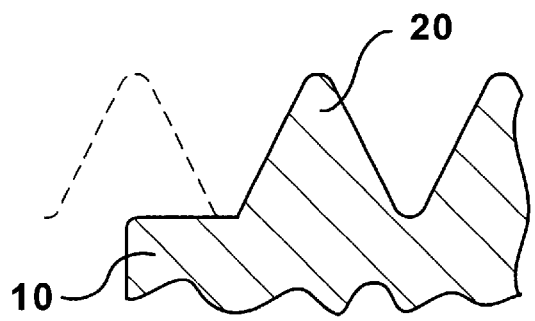
FIGS. 3A–3E show cross-sectional side views of a male fastener having an aligning lead thread of the present invention, wherein each view is of the fastener at a different angle of rotation.
Figure 3B:
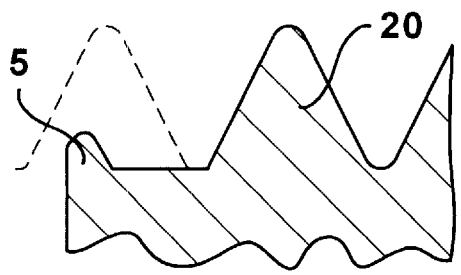
Figure 3C:
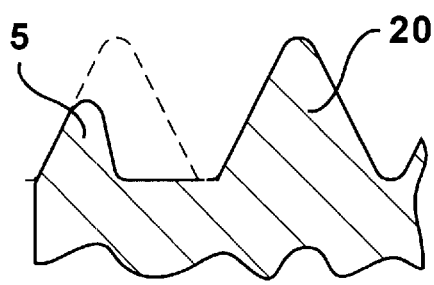
Figure 3D:
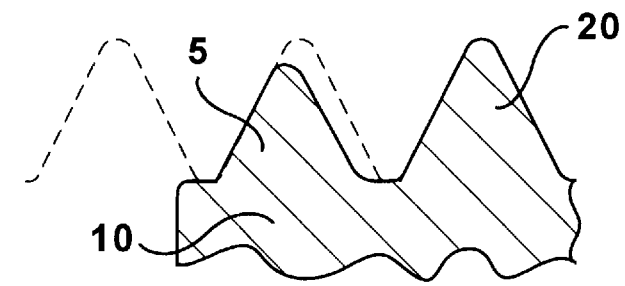
Figure 3E:
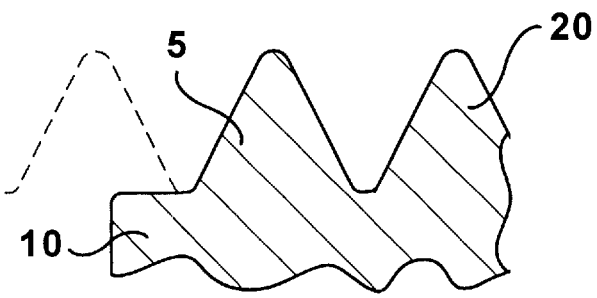

Referring to FIGS. 3A–3E, cross-sectional, side views of a male fastener having an aligning lead thread of the present invention is shown. In these Figures, the fastener is shown at 0°, 90°, 180°, 270°, and 360° of rotation, respectively. As shown in FIG. 3A, the bolt 10 has a full thread 20 at its distal end and the lead thread is absent because it is only starting to form. Next, as shown in FIG. 3B, at the most distal end of the bolt 10, an aligning lead thread 5 protrudes from the bolt. The aligning lead thread 5 is spaced away from the first full thread 20 and forms inside what is the distal side of the what would be a full thread profile (indicated by the dotted lines). As shown in FIG. 3C, where the bolt 10 is shown at 180° of rotation, the aligning lead thread 5 has reached a height approximately equal to the pitch diameter. Yet, even though the aligning lead thread 5 is approximately as tall as the pitch diameter, it is still spaced away from the first full thread 20. The aligning lead thread 5 also begins to follow the distal flank of a full thread profile (indicated by a dotted line). In FIG. 3D, where the bolt 10 is shown at 270° of rotation, the aligning lead thread 5 approaches a full thread height. However, the aligning lead thread S is still shifted away from the first full thread 20 while remaining inside the profile of what would be a standard full thread (shown by the dotted line). Finally, in FIG. 3E, the fastener is shown at 360° of rotation, where the aligning lead thread 5 has grown to full height to become incorporated into the first full thread 20.

Figure 4:
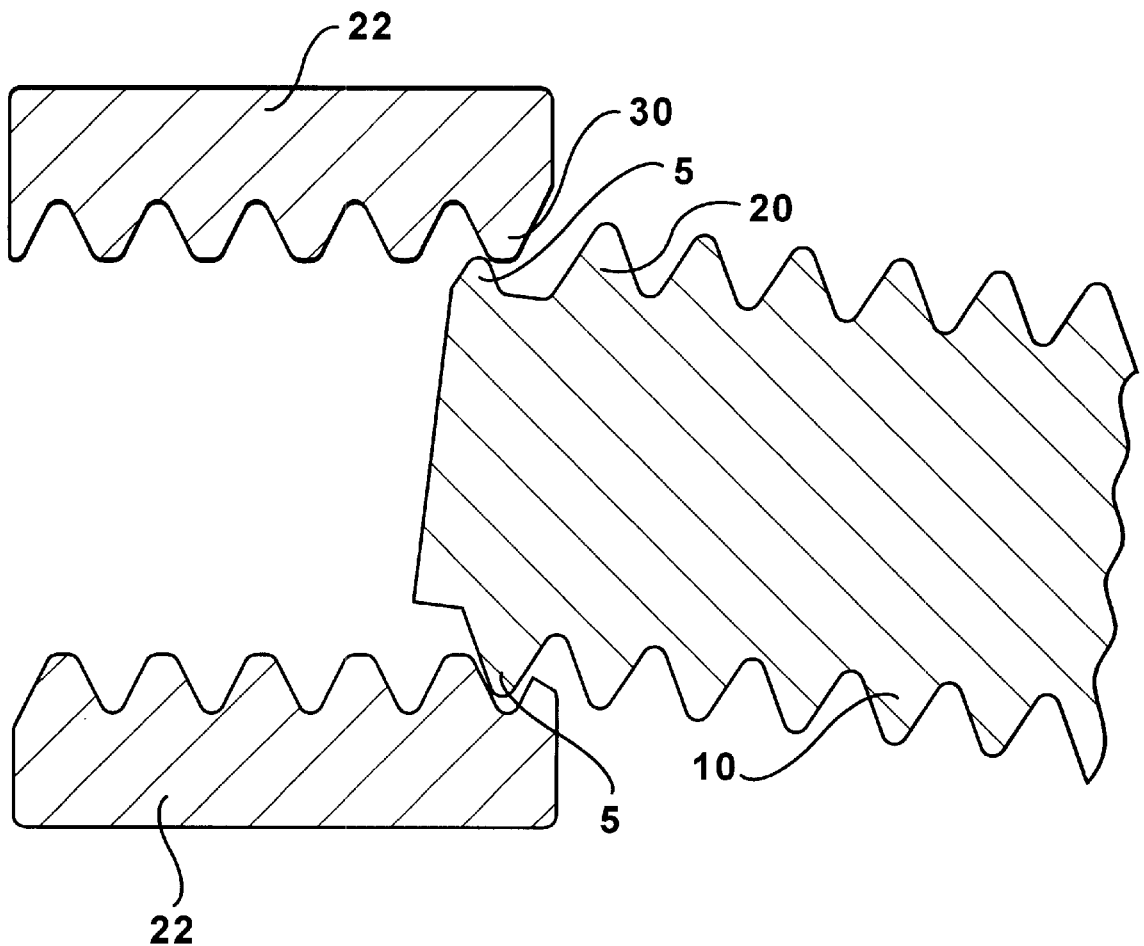
FIG. 4 shows side cross-sectional views of male and female fasteners wherein the male fastener has an aligning lead thread of the present invention.

Referring to FIG. 4, a cross-sectional side view is provided of a bolt 10 and a nut 22, which are in a misaligned position. The bolt 10 has an aligning lead thread 5 at its distal end. The rotational position of the bolt 10 as shown is similar to that of FIGS. 3C and 3E, wherein at the top the aligning lead thread 5 has grown to a height approximately equal to the pitch diameter. At the bottom of the figure, where the bolt 10 has engaged the nut 22, the aligning lead thread 5 has grown to the height of and become incorporated with the first full thread 20 similar to the view shown in FIG. 3E. In this position at the bottom of the Figure, the lead thread 5 is engaged with the nut 22 between the nut's 22 lead thread and first full thread. However, even though the bolt 10 and nut 22 are misaligned, the portion of the aligning lead thread 5 shown at the top of the figure is positioned adjacent to the interior flank of the first full thread 30 of the nut 22. The aligning lead thread 5 functions to pull the bolt 10 and nut 22 into alignment as the lead thread engages the interior flank of the nut's 22 first full thread 30. As the fasteners are screwed together, the aligning lead thread 5 grows in height adjacent the interior flank of the first full thread 30 so that the space between the aligning lead thread 5 and the bolt's 10 first full thread 20 becomes smaller. The aligning lead thread 5 grows as the fasteners are turned relative to each other to force the alignment of the fastener elements. With this configuration, the aligning lead thread 5 enables the bolt 10 and nut 22 to become aligned as they are screwed into one another.

Figure 5A:
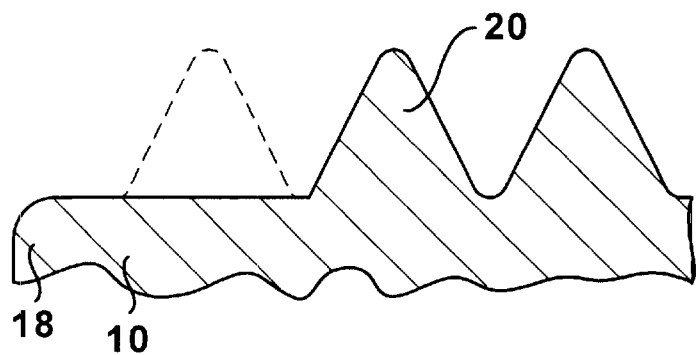
FIGS. 5A–5E show side cross-sectional views of a male fastener having an aligning lead thread of the present invention, wherein the fastener farther comprises a dog point, wherein each view is of the fastener at a different angle of rotation.
Figure 5B:
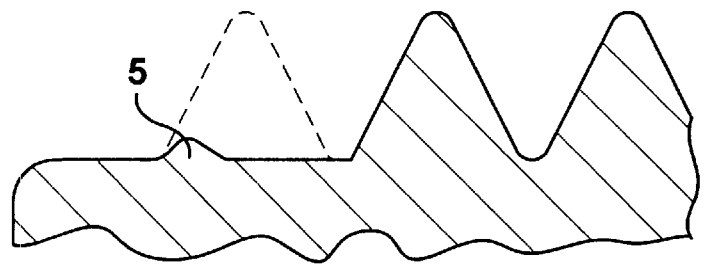
Figure 5C:
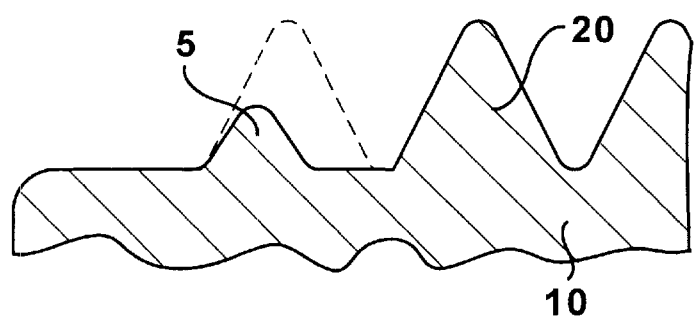
Figure 5D:
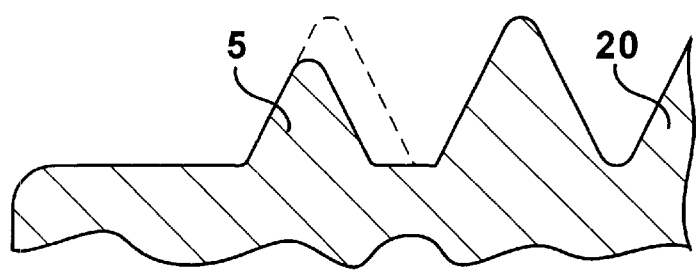
Figure 5E:
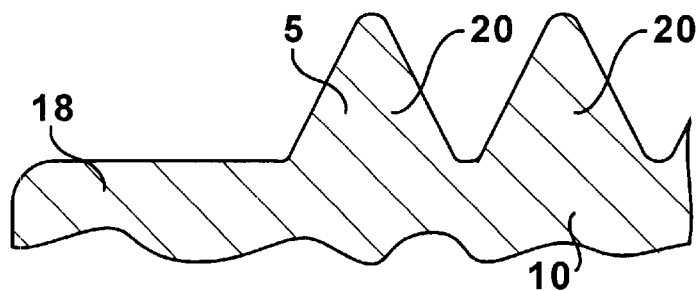

Referring to FIGS. 5A–5E, cross-sectional side views of a male threaded fastener of the present invention are shown. In particular, side views taken at 0°, 90°, 180°, 270°, and 360° of rotation, respectively, are shown. The additional feature of this embodiment of the invention not previously shown is that of a dog point 18 which extends from the distal end of the bolt 10. In FIG. 5A, the first full thread 20 is shown and the aligning lead thread 5 is absent. In FIG. 5B, the aligning lead thread 5 begins to protrude from the shank and is located toward the distal flank of what would be a standard or full thread profile (shown by the dotted line). In FIG. 5C, which is a view taken at 180° of rotation, the aligning lead thread 5 has grown to a height approximately equal to the pitch diameter. In FIG. 5D, the aligning lead thread 5 remains shifted away from the first full thread 20 but has now grown to a height exceeding the pitch diameter. In FIG. 5E, the aligning lead thread 5 has grown to the height of and become incorporated into the first full thread 20.

Figure 6A:
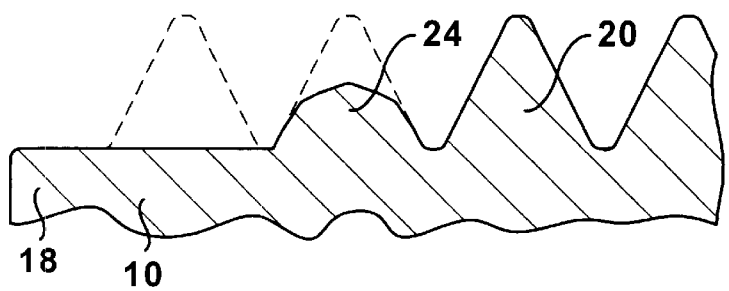
FIGS. 6A–6E show side cross-sectional views of a male fastener having an aligning lead thread of the present invention, anti-cross threading transitional threads and full threads, wherein each view is of the fastener at a different angle of rotation.
Figure 6B:
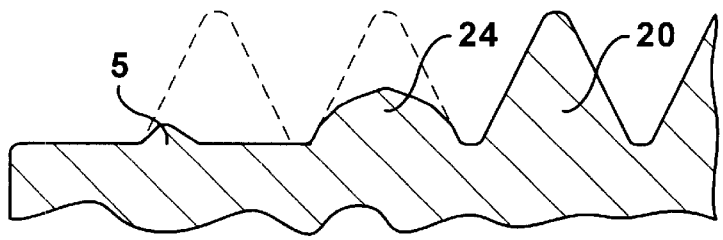
Figure 6C:
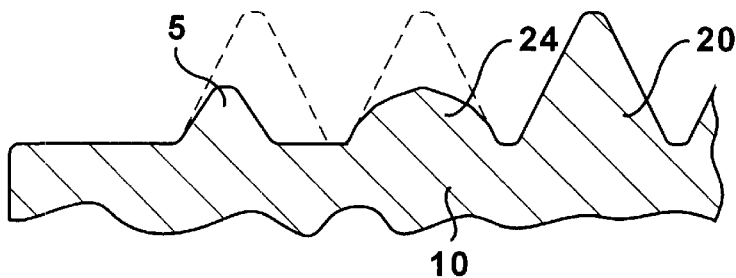
Figure 6D:
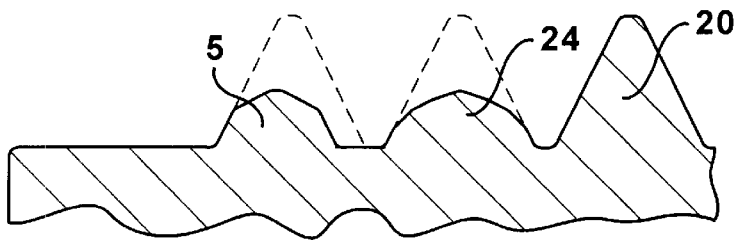
Figure 6E:
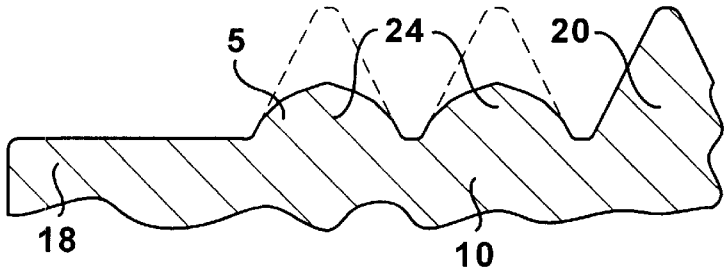

Referring to FIGS. 6A–6E, cross-sectional side views of a male threaded fastener of the present invention are shown. In particular, side views taken at 0°, 90°, 180°, 270°, and 360° of rotation, respectively, are shown. The additional feature of this embodiment of the invention not previously shown is that of transitional threads 24 which are positioned between the aligning lead thread 5 and the full threads 20. Transitional threads 24 are described in greater detail below. In FIG. 6A, the transitional thread 24 is shown toward the distal end of the bolt 10 and the aligning lead thread 5 is absent. In FIG. 6B, the aligning lead thread 5 begins to protrude from the shank and is located toward the distal flank of what would be a standard or full thread profile (shown by the dotted line). In FIG. 6C, which is a view taken at 180° of rotation, the aligning lead thread 5 has grown to a height approximately equal to the pitch diameter. In FIG. 6D, the aligning lead thread 5 remains shifted away from the transitional thread 24 but has now grown to begin to assume the same shape as a transitional thread. In particular, the aligning lead thread 5 has a height approximately equal to the pitch diameter and is wider than shown in FIG. 6C. In FIG. 6E, the aligning lead thread 5 has grown to the same shape and configuration of a transitional thread 24 and become incorporated into the transitional thread 20. Of course, the transitional thread 24 merges into and becomes part of the full thread 20.

Figure 7:
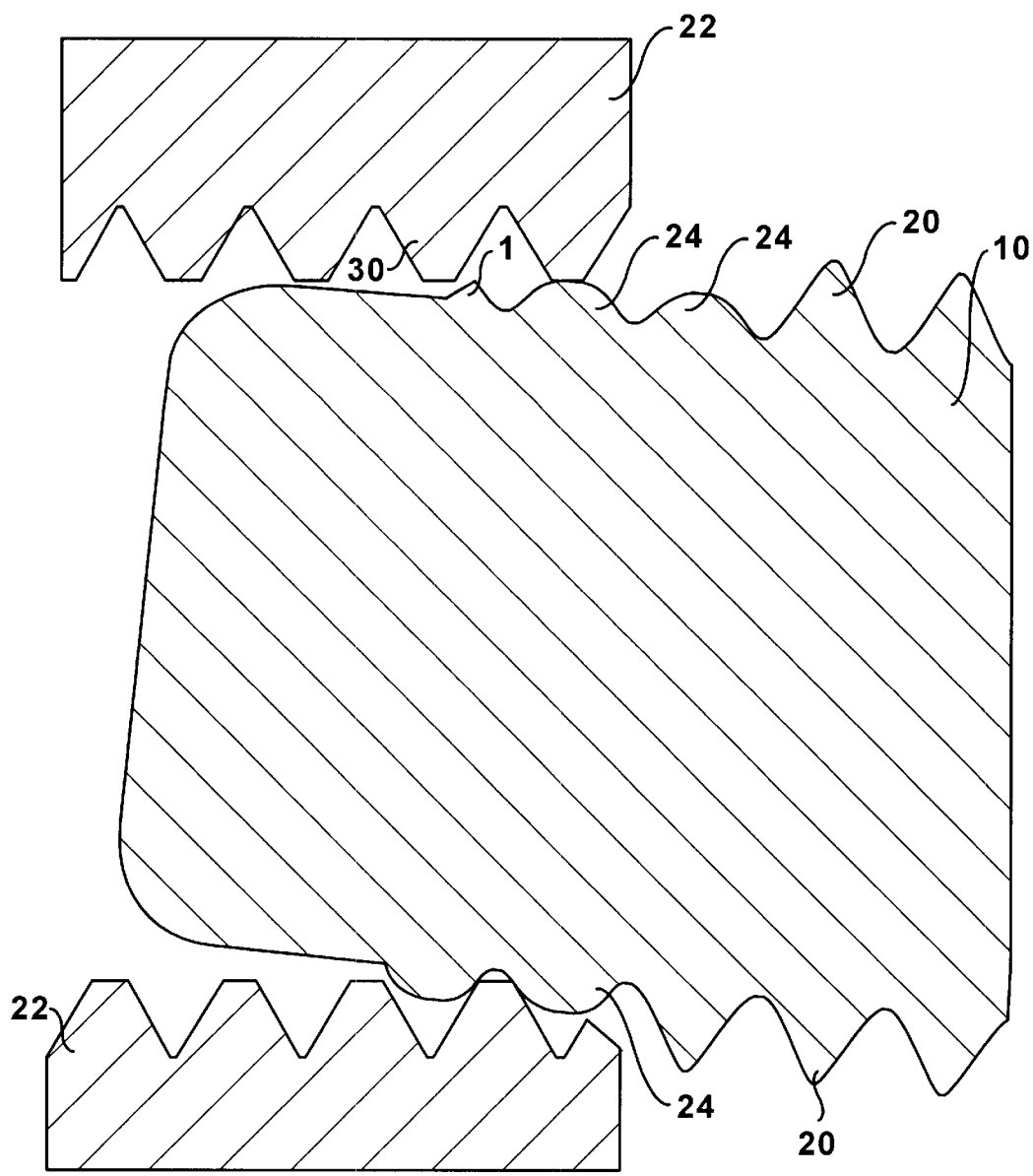
FIG. 7 shows a cross-sectional side view of a male and female fastener wherein the male fastener comprises a lead thread of the prior art, transitional anti-cross threading threads and full threads.

Referring to FIG. 7, a cross-sectional side view is provided of a bolt 10 and a nut 22, which are in a misaligned position. The bolt 10 has a typical lead thread 1 which begins at toward the distal end of the bolt 10 and merges into two transitional threads 24. The transitional threads 24 also merge into the full threads 20 as discussed above. In this position at the bottom of the figure, the transitional threads are engaged with the lead thread and first full thread of the nut 22. However, because the bolt 10 and nut 22 are misaligned, at the top of the figure, the first transitional thread 24 is in contact with the first full thread of the nut 22. Also at the top of the figure, the typical lead thread 1 is positioned adjacent to the exterior flank of the second full thread 30 of the nut 22. Because the lead thread 1 is a prior art lead thread it becomes trapped behind, or adjacent the exterior flank of the full thread 30 of the nut 22. This results in a cross-thread condition as the fasteners are further screwed into each other.

Figure 8:
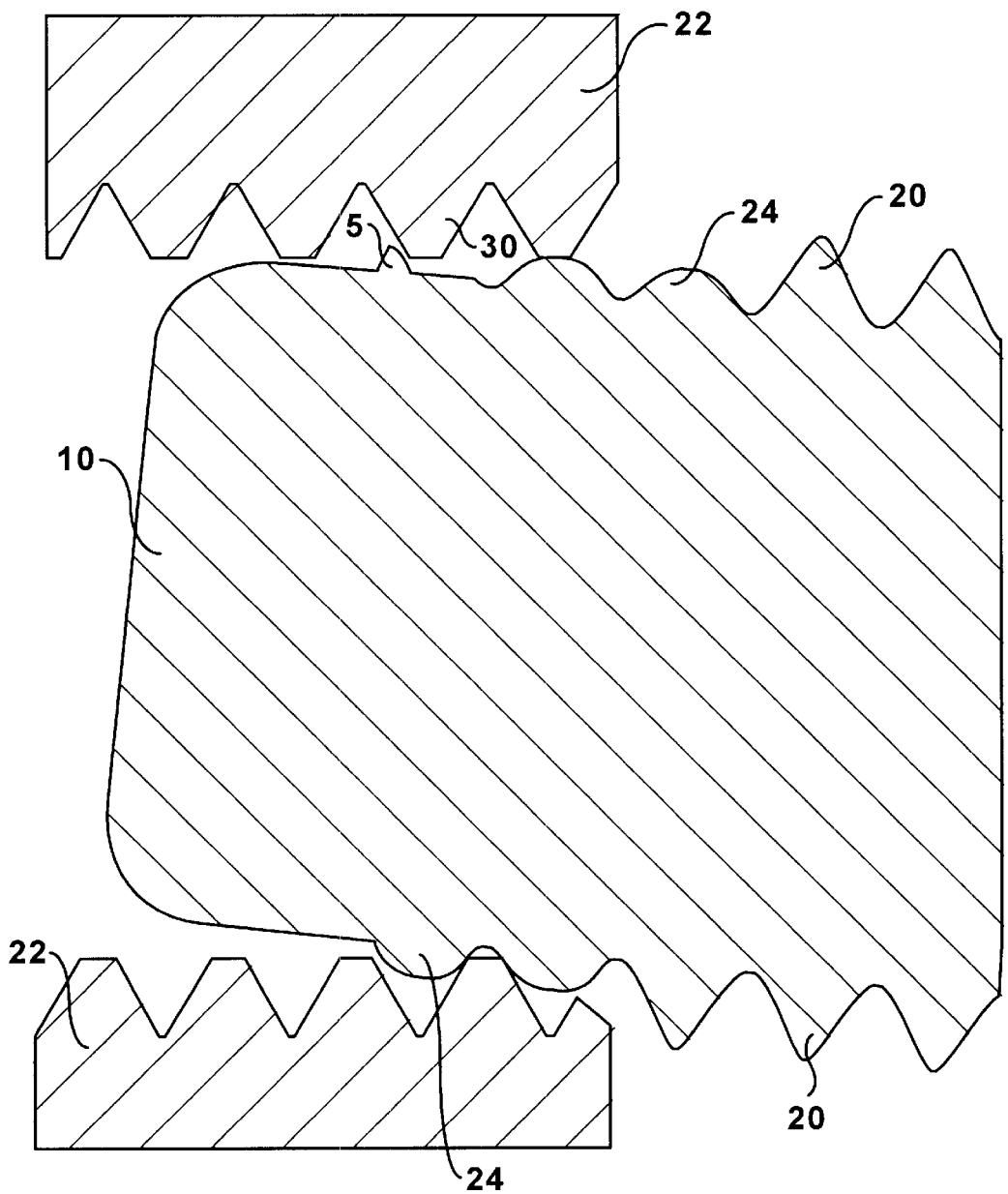
FIG. 8 shows a cross-sectional side view of male and female fasteners wherein the male fastener comprises an aligning lead thread of the present invention, transitional anti-cross threading threads and full threads.

Referring to FIG. 8, a cross-sectional side view is provided of a bolt 10 and a nut 22, which are in a misaligned position. The bolt 10 and nut 22 are similar to the configuration shown if FIG. 7 except that the bolt 10 has an aligning lead thread 5 of the present invention at its distal end. The rotational position of the bolt 10 as shown is similar to that of FIGS. 6C and 6E. At the top, the aligning lead thread 5 has grown to a height approximately equal to the pitch diameter. At the bottom of the figure, where the bolt 10 has engaged the nut 20, the aligning lead thread 5 has grown to the height of and become incorporated with the first transitional thread 24 similar to the view shown in FIG. 6E. In this position at the bottom of the FIG., the transitional threads 24 are engaged with the first full thread of the nut 22. However, even though the bolt 10 and nut 22 are misaligned, the portion of the aligning lead thread 5 shown at the top of the figure is positioned adjacent to the interior flank of the first fall thread 30 of the nut 22. The alinging lead thread 5 functions to pull the bolt 10 and nut 22 into alignment as the lead thread engages the interior flank of the nut's 22 first full thread 30. As the fasteners are screwed together, the alinging lead thread 5 grows in height adjacent the interior flank of the second full thread 30 so that the space between the aligning lead thread 5 and the bolt's 10 first transitional thread 24 becomes smaller. The aligning lead thread 5 grows as the fasteners are turned relative to each other to force the alignment of the fastener elements and the transitional threads 24 cam past the full threads 30.

While the aligning lead thread 5 is illustrated for use on a male threaded member or bolt, it is equally effective for use on a female threaded member or nut.

The transitional threads are herein described. By providing at least one of the lead threads with a transitional curved surface feature from the minor diameter to the major diameter of the threads, any misalignment of the threads will cause the at least one lead thread surface to cam over the mating component thread and thus realign. The initial presentation angle of the mating component threads may be restricted and thereby reduce the misalignment angle by providing a protruding diameter feature before the transitional threads.

Referring now to FIGS. 9A–9D, schematic elevational views of the present invention at various stages of threading engagement are illustrated. A threaded fastener bolt is illustrated and generally designated by the reference numeral 10. The threaded bolt 10 comprises a head 12 having flat faces 14, a threaded shank 16, and a protruding diameter opposite the head 12, commonly referred to as a dog point 18.

The head 12 is adapted to be engaged by a tool (not illustrated) for applying rotational torque to the bolt 10. A plurality of faces 14 on the head 12 provide flat surfaces adapted to receive and provide a non-slip surface for the tool such as a wrench, socket, pliers and the like. The head 12 may also be slotted to receive a screwdriver blade (flat, Phillips, Torx, etc.). It is the intent of the invention to encompass all adaptations for imparting rotational torque to the bolt 10. In addition, the invention may be utilized with any type of threaded fastener such as, for example, a bolt, screw, stud, rod or other substantially round member having a uniform, non-uniform or tapered external helical thread that can be screwably engaged into a mating member such as a nut, bolt or hole having a substantially matching internal helical thread. The mating member (nut illustrated in cross section) is generally represented by the numeral 22.

Figure 9A:
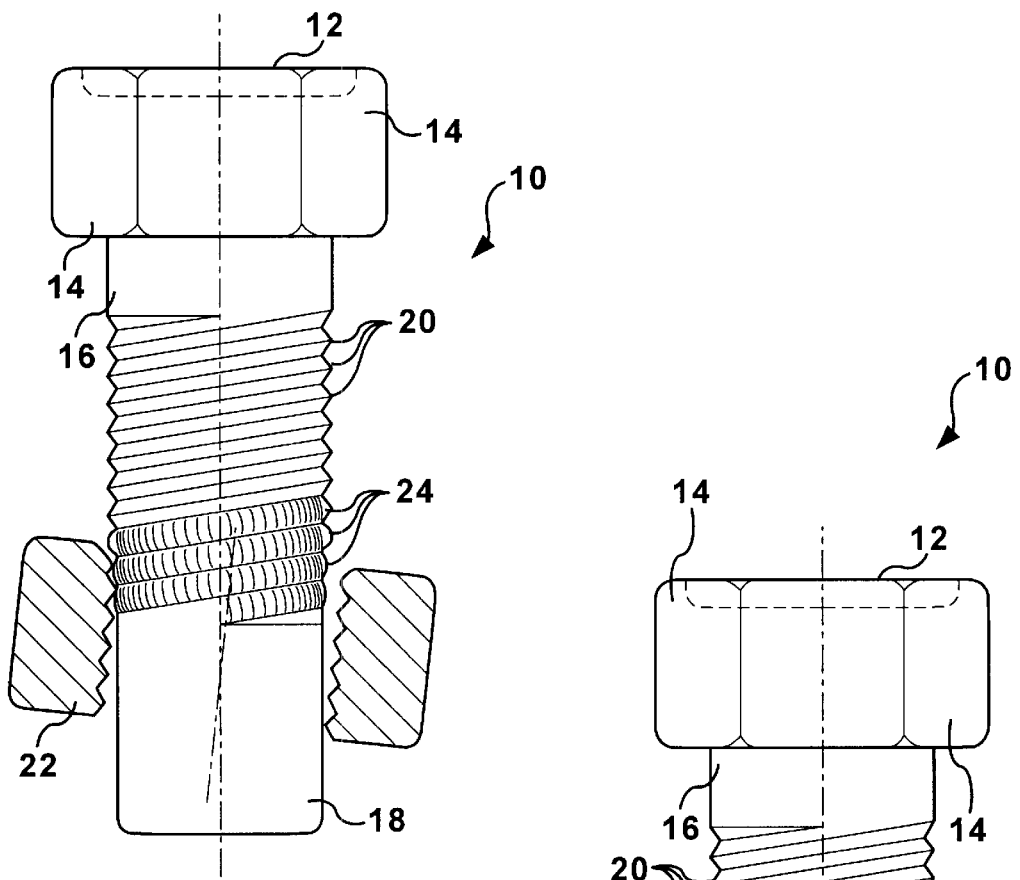
FIGS. 9A–9D illustrate schematic elevational views of fasteners having transitional threads at various stages of threading engagement.

FIG. 9A illustrates the initial installation of the bolt 10 and nut 22 at a maximum misalignment condition. The dog point 18 restricts the angular misalignment of the helical threads on the shank 16 and the nut 22. The dog point 18 is optional and may be absent for short bolts or shallow threaded holes with a blocked bottom. The dog point 19 diameter preferably may be 90 percent of the minor inside diameter of the nut 22 and approximately one nominal size diameter of the shank 16 in length.

Figure 9B:
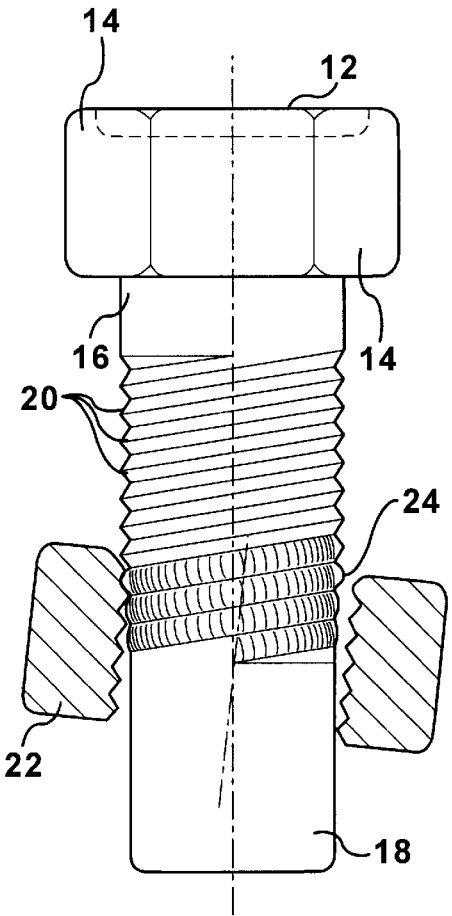

FIG. 9B illustrates the relative angular position between the bolt 10 and nut 22 after an initial 360 degree rotation. As illustrated, the first and second transitional threads 24 are engaging the left mating threads (of the sectional view) of the nut 22 and the curved surfaces on the threads 24 cam over the right mating threads (of the sectional view) on the nut 22.

Figure 9C:
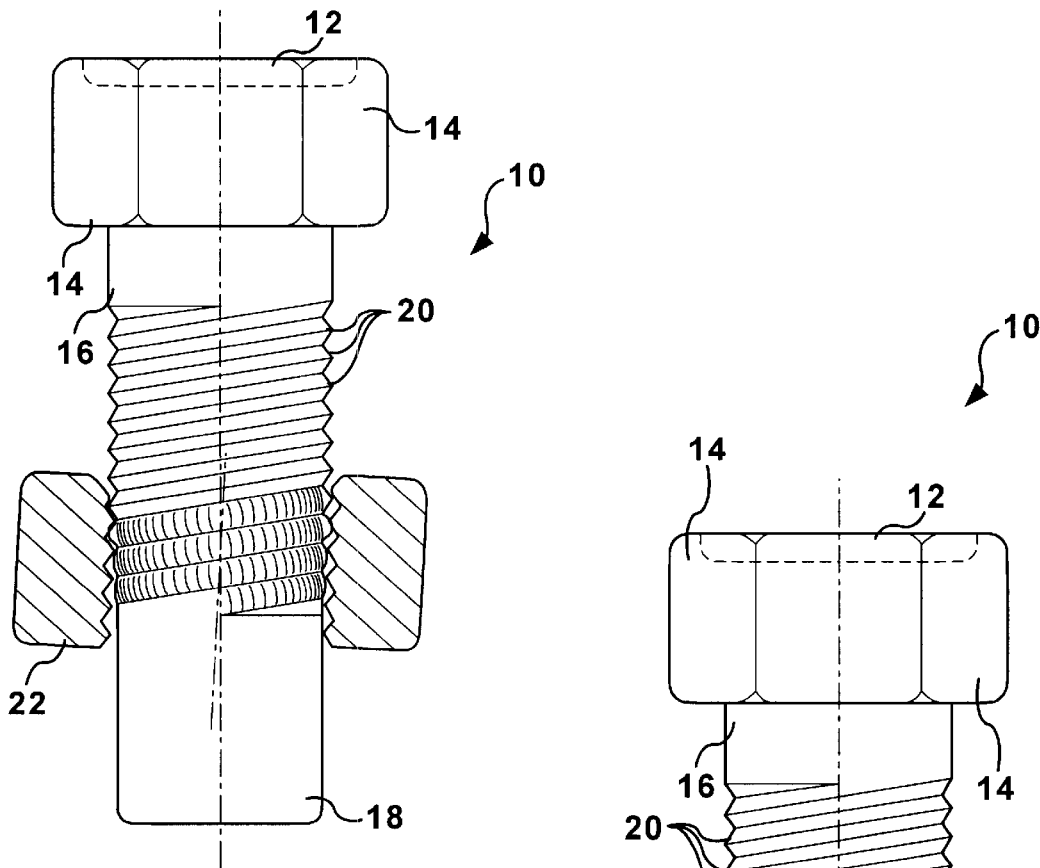

FIG. 9C illustrates the engagement of the threads 24 with the mating threads of the nut 22 after two full rotations (720 degrees). It can be seen that the threaded helixes of the bolt 10 and nut 22 have forced their respective planes to align and the axis of both the bolt 10 and nut 22 to become collinear. As a result, the threads 20 are no longer positioned to become cross-threaded with the mating threads of the nut 22.

Figure 9D:
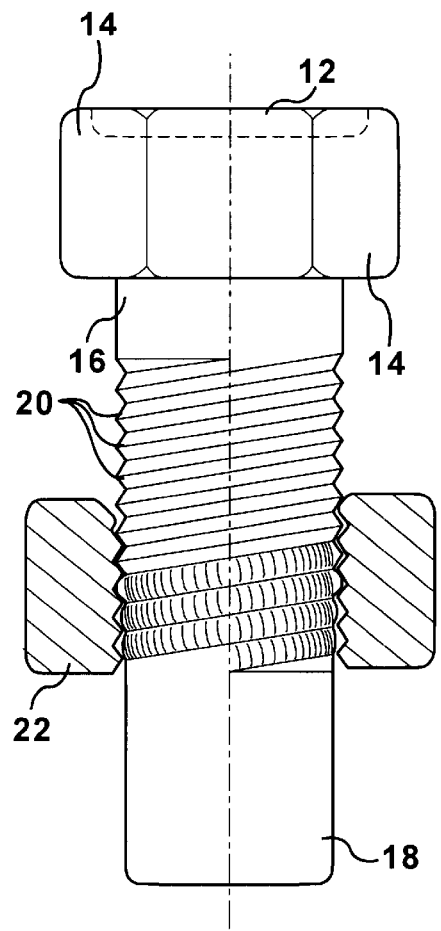

FIG. 9D illustrates full and proper engagement of the bolt 10 and nut 22 in a correct collinear alignment so that there is no possibility that the threads 22 can wedge against the mating threads of the nut 22 to become cross-threaded. An advantage of the present invention is its ability to prevent cross-threading by unskilled workers or by automatic insertion and fastening machines that may be out of adjustment.

Figure 10A:
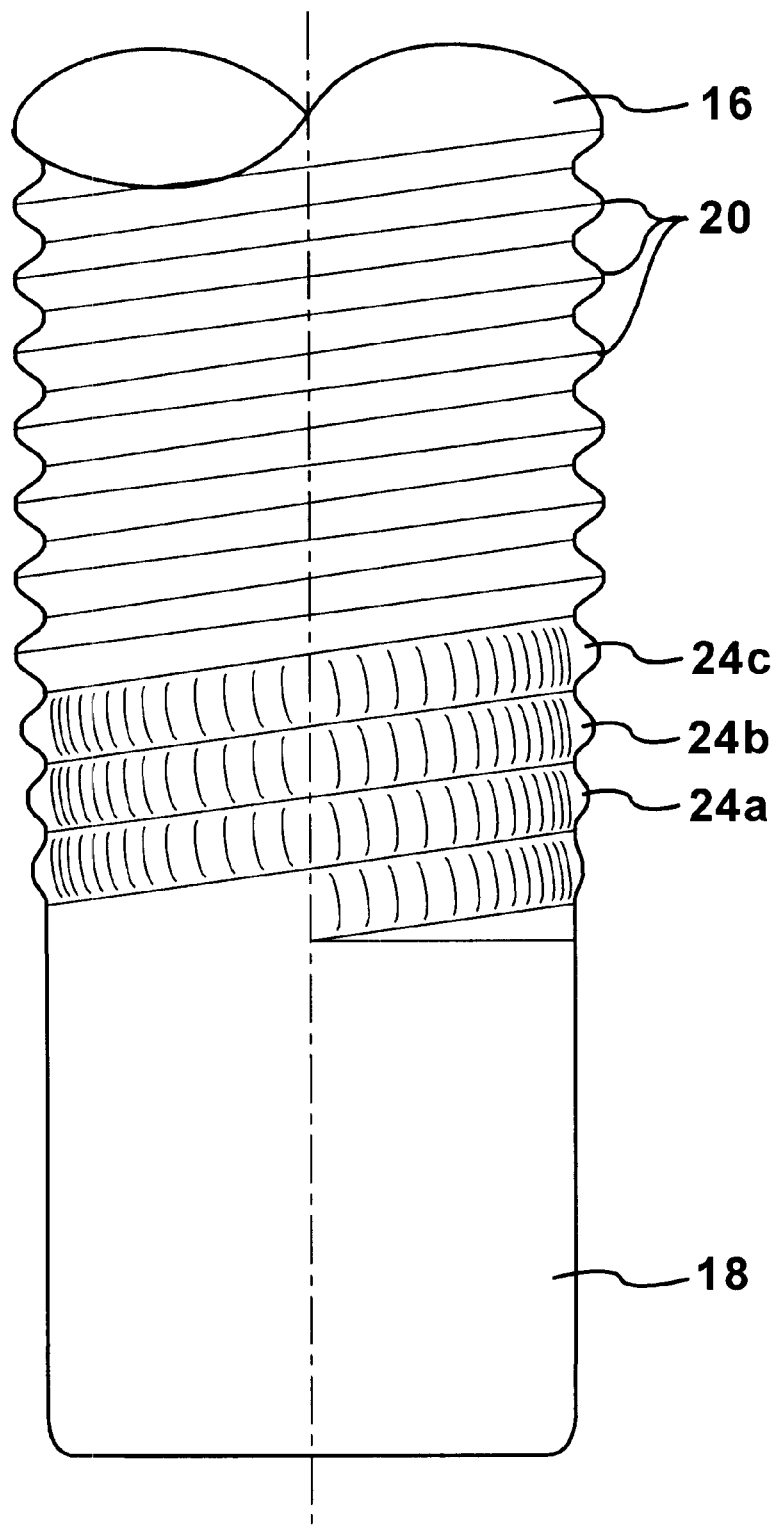
FIG. 10A illustrates a schematic elevational view of a fastener with external transitional threads as shown in FIGS. 9A–9D.
Figure 10B:
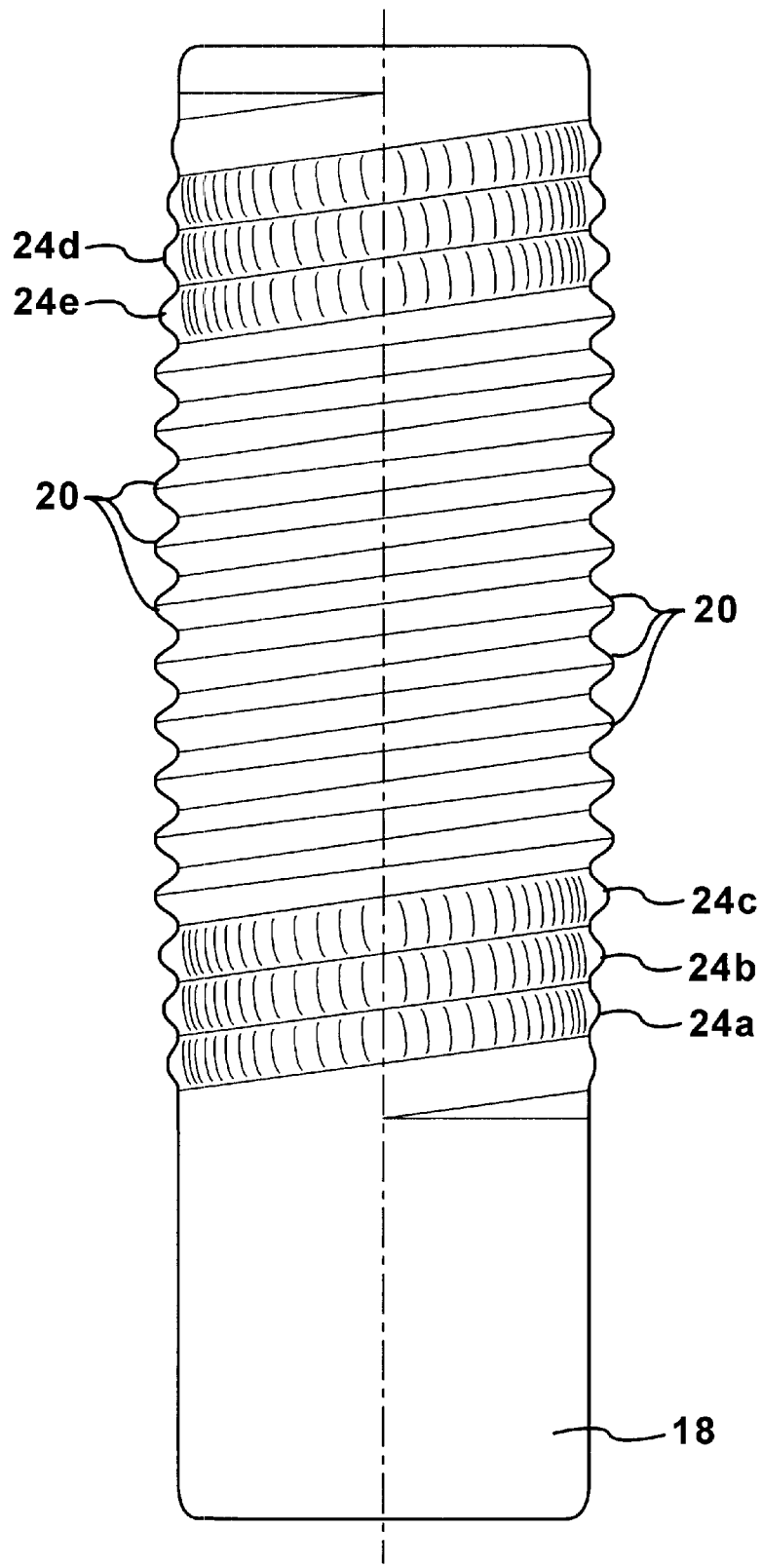
FIG. 10B shows a male fastener having transitional threads on both ends.

Referring now to FIG. 10A, a schematic elevational partial view of the threaded shank 16 of FIGS. 9A–9D is illustrated. The shank 16 has threads such as standard machine threads and at least two transitional threads 24 toward the end of the shank 16 opposite the head 12. The dog point 18 is also illustrated but is not required for all configurations of the present invention. Three transitional threads 24a, 24b and 24c are illustrated. Only one transitional thread 24a is necessary for operation, however, two or more threads 24 may also be used with equally good results.

The threads 24 have the same minor thread diameter as the other threads 20, but differ in that a curved surface is blended into the flanks of the threads 24. The curved surface of the threads 24 may be round, parabolic or any other curved shape that may be easily rolled when forming the threads 22, 24 on the shank 16 (see FIGS. 13A–13D). The outside diameter of the primary transition thread 24 preferably does not exceed the pitch diameter and may start anywhere from the first transition thread 24a inward (24b and 24c). The outer diameter of the transition threads 24 are such as to allow them to easily cam over the first few inside threads of the nut 22 (FIG. 9). Once these transition threads 24 cam over during misalignment, the remaining external machine threads 20 are in substantially correct alignment with the mating internal threads of the nut 22 so that cross-threading does not occur.

Figure 11:
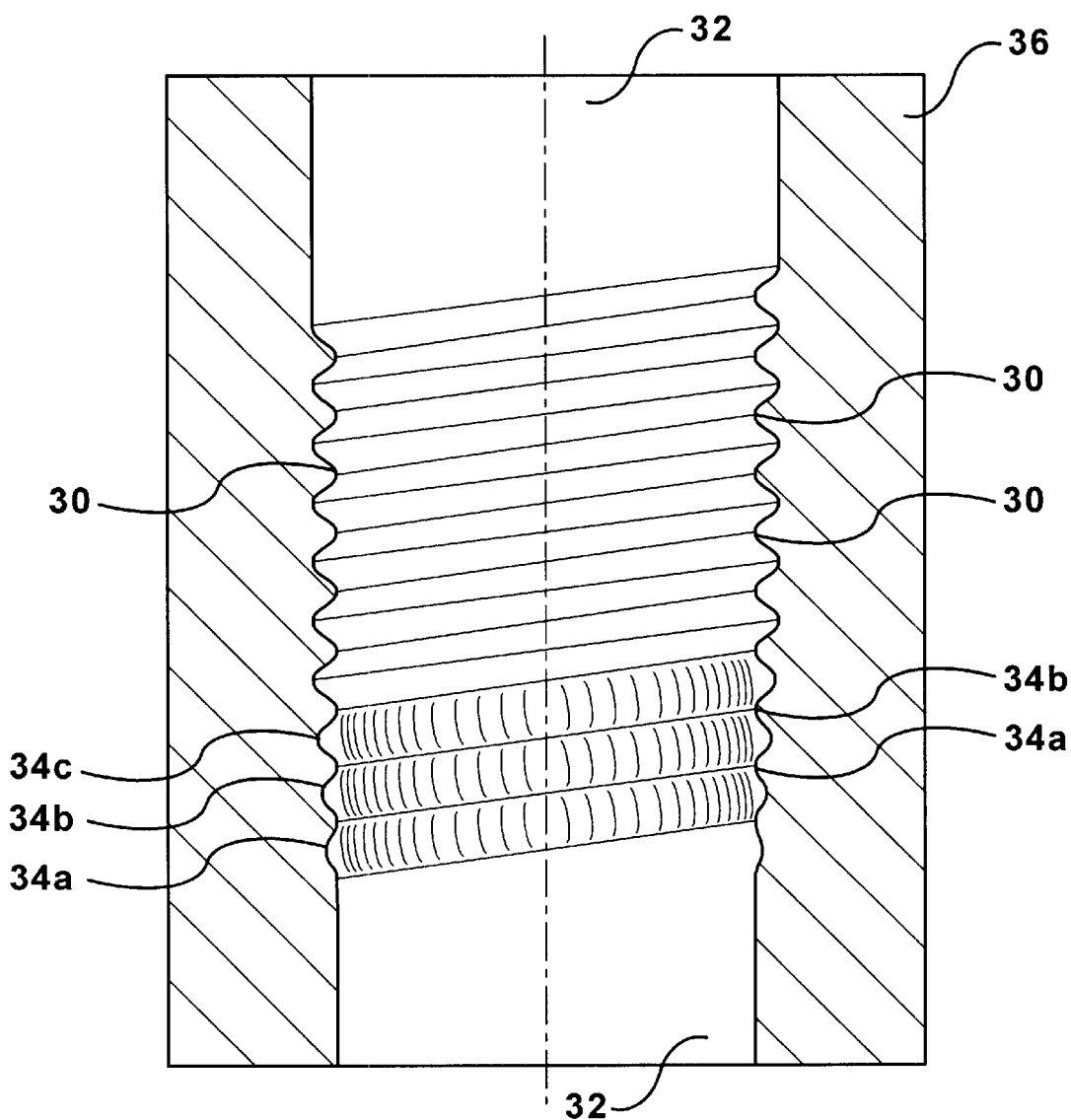
FIG. 11 illustrates a schematic cross section elevational view of internal transitional threads.

Referring now to FIG. 11, a schematic cross section elevational view of a threaded nut is illustrated. An opening 32 in the nut 36 has internal threads 30 and 34. The nut 36 comprises internal threads 30 which may be standard machine threads and at least one transitional thread 34 toward one end of the nut 36. Three transitional threads 34a, 34b and 34c are illustrated. Only one transitional thread 34a is necessary for operation, however, two or more threads 34 may also be used with equally good results.

The threads 34 have the same major internal thread diameter as the other threads 30, but differ in that a transitional curved surface, and/or flat surfaces approximating the shape defined by the curved surface, is blended into the flanks of the threads 34. The curved surface of the threads 34 may be round, parabolic, and/or flat surfaces approximating the shape defined by the curved surface which may be easily rolled when forming the threads 30, 34 in the interior of the nut 36 (see FIGS. 13A–13D). The inner diameter of the primary transition thread 34 preferably does not exceed the pitch diameter and may start anywhere from the first transition thread 34a inward (34b and 34c). The inner diameter of the transition threads 34 are such as to allow them to easily cam over the first few inside threads of a shank 16 (see, generally FIG. 9). Once these transition threads 24 cam over during misalignment, the remaining internal threads 30 are in substantially correct alignment with the mating external threads of the shank 16 so that cross-threading does not occur.

Figure 12:
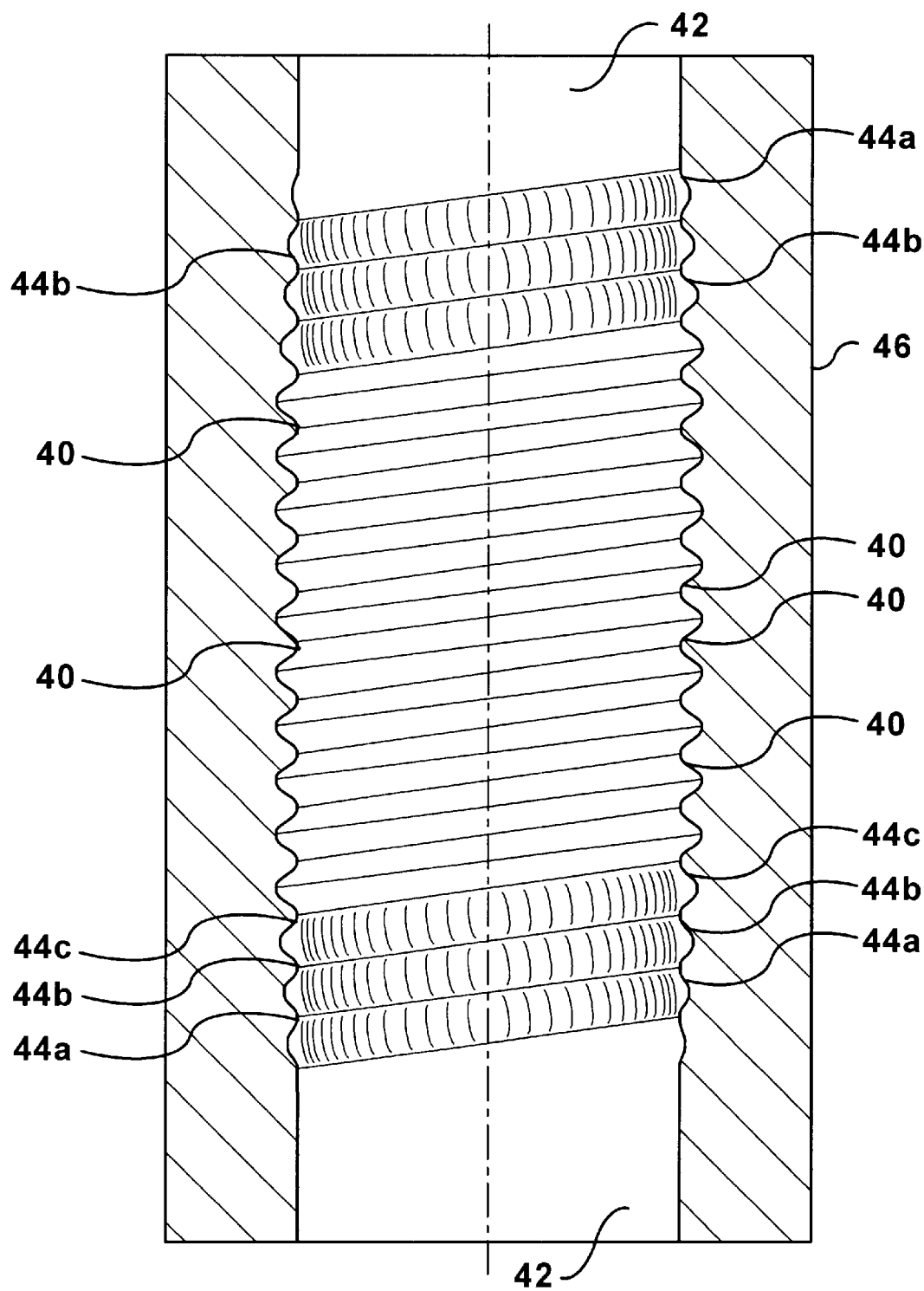
FIG. 12 illustrates a schematic cross section elevational view of another embodiment having internal transitional threads.

Referring now to FIG. 12, a schematic cross section elevational view of another embodiment of a threaded nut is illustrated. An opening 42 in the nut 46 has internal threads 40 and 44. The nut 46 comprises internal threads 30 which may be standard machine threads and at least one transitional thread 44 toward both ends of the nut 36. Three transitional threads 34a, 34b and 34c at each end of the nut 46 are illustrated. Only one transitional thread 34a is necessary for operation, however, two or more threads 44 may also be used with equally good results. Operation of the nut 46 is substantially the same as disclosed above for the nut 36 except that nut 46 need not have a preferred anti-cross-threading end when engaging a shank (not illustrated). Thus, having to observe proper end orientation of the nut 46 is unimportant for operation of this embodiment of the present invention, or the nut 46 may be used as a coupling between two externally threaded rods, shanks bolts and the like.

Figure 13A:
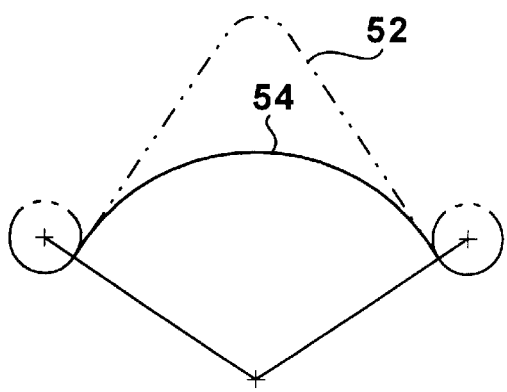
FIGS. 13A–13D illustrate various embodiments of transitional curved surfaces.
Figure 13B:
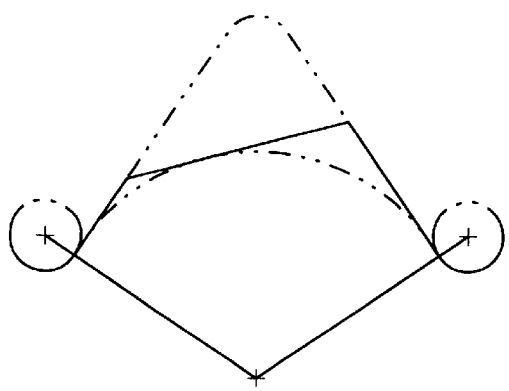
Figure 13C:
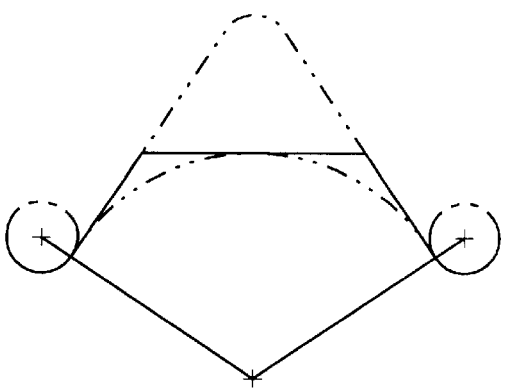
Figure 13D:
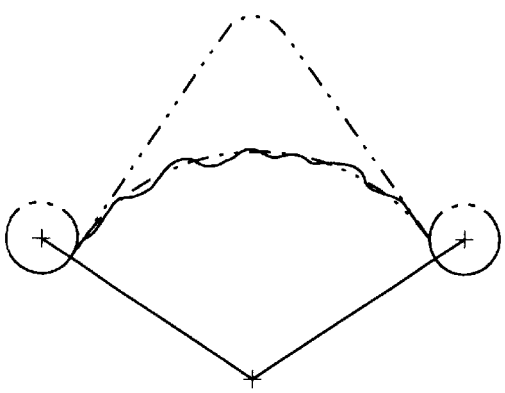

Referring now to FIGS. 13A–13D, various embodiments of the transitional curved surface of the present invention are illustrated. A typical machine thread is illustrated by the dashed line 52 and the transitional curved thread of the present invention is illustrated by the solid line 54. The lead threads (external or internal), as disclosed above, have transitional curved surfaces. These transitional curved surfaces may be preferably implemented as follows: FIG. 13A illustrates a smoothly curving profile for the transitional surface. FIG. 13B illustrates an angled crest flat for the transitional surface. FIG. 13C illustrates a flat truncated crest for the transitional surface. FIG. 13D illustrates a series of flats/curved surfaces approximating the transitional curved surface of FIG. 13A. Many other embodiments of the transitional curved surface may be implemented and are contemplated herein The threads 20, 24 on shank 16 (FIG. 10A), threads 30, 34 on nut 36 (FIG. 11), and threads 40, 44 on nut 46 (FIG. 12) may be formed by rolling, cutting, burnishing, grinding, machining, polishing, laser or any combination thereof A novel aspect of the present invention is the use of a special thread roll die having the desired curvature for the transitional threads as well as the machine threads to be formed on a blank tubular shank or internal opening in a nut. The special thread roll die may be used with a standard thread rolling machine to produce the novel features of the present invention. The special thread roll die has a mirror image of the desired threads 20, 24 so that when the blank shank is rolled to produce threads thereon, the desired curvature and radius on the transition threads are also produced. A threaded tap having a mirror image of the desired curvature transitional threads as well as the machine threads may be used to form the threads, as disclosed above, for the nut 36.

While the particular embodiments for assemblies and methods for anti-cross threading fasteners as herein shown and disclosed in detail are fully capable of obtaining the objects and advantages hereinbefore stated, it is to be understood that they are merely illustrative of the preferred embodiments of the invention and that no limitations are intended by the details of construction or design herein shown other than as described in the appended claims.

What is claimed is:

1. An anti-cross threading fastener, comprising:
    a substantially round shank member having first and second ends and a continuous helix comprised of a plurality of threads around a circumference of said shank member, the plurality of threads being adapted to mate with corresponding threads of a receiving member;
    a lead thread of the plurality of threads proximate the first end of said shank member; and
    a remaining plurality of threads, wherein the lead thread merges into the remaining plurality of threads to form the continuous helix;
    wherein the distance between a first line drawn perpendicular to the longitudinal axis of the fastener and through the middle of the crest of the forming lead thread and a second line drawn perpendicular to the longitudinal axis of the fastener and through the middle of the crest of an adjacent full thread decreases as the lead thread is formed into a full thread, and wherein the longitudinal axis of the fastener, the first line drawn perpendicular to the longitudinal axis of the fastener, and the second line drawn perpendicular to the longitudinal axis of the fastener are in the same plane.

2. The anti-cross threading fastener of claim 1, wherein the lead thread is configured within a profile similar to a profile of the remaining plurality of threads.

3. An anti-cross threading fastener, comprising:

a substantially round shank member having first and second ends and a continuous helix comprised of a plurality of threads around a circumference of said shank member, the plurality of threads being adapted to mate with corresponding threads of a receiving member;

a lead thread of the plurality of threads proximate the first end of said shank member;

a transitional thread, wherein the lead thread merges into the transitional thread to form the continuous helix; and a remaining plurality of threads, wherein the transitional thread merges into the remaining plurality of threads to form the continuous helix; and wherein the distance between a first line drawn perpendicular to the longitudinal axis of the fastener and through the middle of the crest of the forming lead thread and a second line drawn perpendicular to the longitudinal axis of the fastener and through the middle of the crest of an adjacent full transitional thread decreases as the lead thread is formed into a full transitional thread, and wherein the longitudinal axis of the fastener, the first line drawn perpendicular to the longitudinal axis of the fastener, and the second line drawn perpendicular to the longitudinal axis of the fastener are in the same plane.

4. An anti-cross threading fastener, comprising:

a substantially round shank having first and second ends and a continuous helix comprised of a plurality of threads around a circumference of said shank member, the plurality of threads being adapted to mate with corresponding threads of a receiving member;

at least one full thread of the plurality of threads, wherein the at least one full thread defines a full thread profile; and a lead thread proximate the first end of said shank member, wherein the lead thread merges into the at least one full thread, wherein the lead thread fits within an overlaid full thread profile, and wherein the distance between a first line drawn perpendicular to the longitudinal axis of the fastener and through the middle of the crest of the forming lead thread and a second line drawn perpendicular to the longitudinal axis of the fastener and through the middle of the crest of an adjacent full thread decreases as the lead thread is formed into a full thread, and wherein the longitudinal axis of the fastener, the first line drawn perpendicular to the longitudinal axis of the fastener, and the second line drawn perpendicular to the longitudinal axis of the fastener are in the same plane.

5. An anti-cross threading fastener as claimed in claim 4, wherein a root of the lead thread is rounded into a root of the at least one full thread.

6. An anti-cross threading fastener as claimed in claim 4, wherein there is an unthreaded portion of the shank between a root of the lead thread and a root of the at least one full thread.

7. The anti-cross threading fastener of claim 4, further comprising a protruding diameter member attached to and collinear with the first end of said shank member, said protruding diameter member adapted to restrict a presentation angle between said shank member and a receiving member.

8. The anti-cross threading fastener of claim 7, wherein a diameter of said protruding diameter member is about 90 percent of a minor diameter of the plurality of threads and about one diameter of said shank member in length.

9. The anti-cross threading fastener of claim 4, further comprising a head fixedly attached to the second end of said shank member, said head adapted for transmission of rotational torque to said shank member.

10. The anti-cross threading fastener of claim 4, wherein said lead thread comprises a plurality of lead threads.

11. The anti-cross threading fastener of claim 4, wherein said lead thread extends less than 360 degrees around the shank.

12. An anti-cross threading fastener, comprising:

a substantially round shank member having first and second ends and a continuous helix comprised of a plurality of threads around a circumference of said shank member, the plurality of threads being adapted to mate with corresponding threads of a receiving member;

a full thread of the plurality of threads;

a camming thread of the plurality of threads, wherein the camming thread merges into the at least one full thread to form the continuous helix, wherein the camming thread defines a camming thread profile; and a lead thread of the plurality of threads proximate the first end of said shank member, wherein the lead thread merges into the camming thread to form the continuous helix; wherein the lead thread fits within an overlaid camming thread profile, and wherein the distance between a first line drawn perpendicular to the longitudinal axis of the fastener and through the middle of the crest of the forming lead thread and a second line drawn perpendicular to the longitudinal axis of the fastener and through the middle of the crest of an adjacent full camming thread decreases as the lead thread is formed into a full camming thread, and wherein the longitudinal axis of the fastener, the first line drawn perpendicular to the longitudinal axis of the fastener, and the second line drawn perpendicular to the longitudinal axis of the fastener are in the same plane.

13. The anti-cross threading fastener of claim 12, wherein the major diameter of the full thread is greater than the major diameter of the camming thread and wherein the camming thread profile is different than the full thread profile.

14. The anti-cross threading fastener as claimed in claim 12, wherein a root of the lead thread is rounded into a root of the camming thread.

15. The anti-cross threading fastener as claimed in claim 12, wherein there is an unthreaded portion of the shank between a root of the lead thread and a root of the camming thread.

16. The anti-cross threading fastener of claim 12, further comprising a protruding diameter member attached to and collinear with the first end of said shank member, said protruding diameter member adapted to restrict a presentation angle between said shank member and a receiving member.

17. The anti-cross threading fastener of claim 16, wherein a diameter of said protruding diameter member is about 90 percent of a minor diameter of the plurality of threads and about one diameter of said shank member in length.

18. The anti-cross threading fastener of claim 12, further comprising a head fixedly attached to the second end of said shank member, said head adapted for transmission of rotational torque to said shank member.

19. The anti-cross threading fastener of claim 12, wherein said camming thread comprises a plurality of camming threads.

20. The anti-cross threading fastener of claim 12, wherein said lead thread comprises a plurality of lead threads.

21. The anti-cross threading fastener of claim 12, wherein said lead thread extends less than 360 degrees around the shank.

* * * * *